J. S. WAIT, Jr. & A. HALLIDAY.
BOLT.
APPLICATION FILED MAY 8, 1913.
1,082,376.
Patented Dec. 23, 1913.
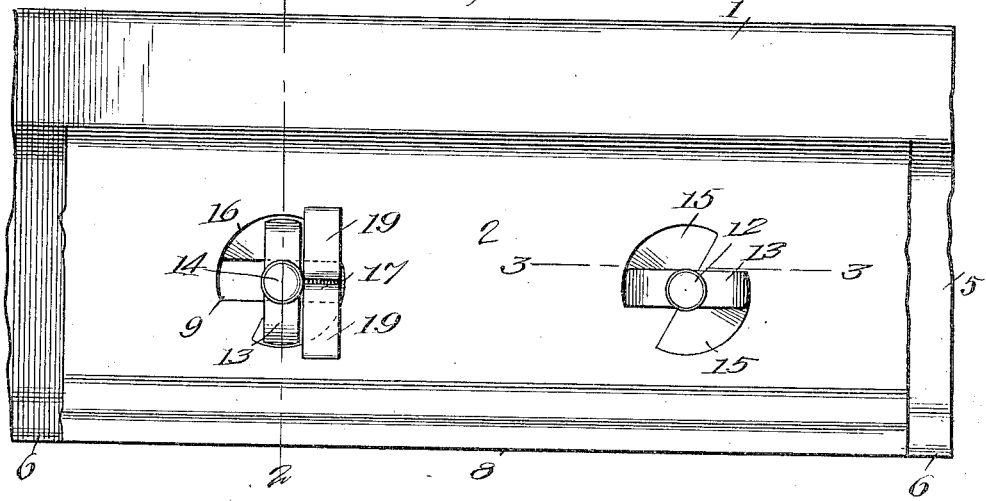
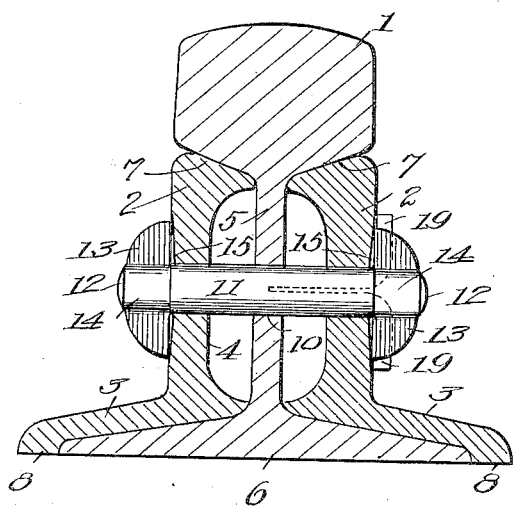
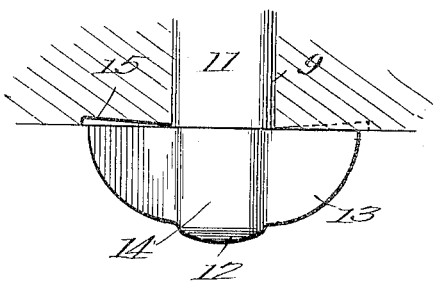
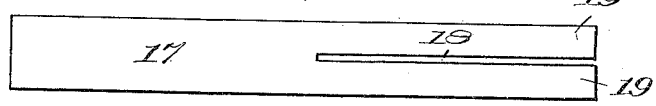
WITNESSES
INVENTORS
John Scott Wait Jr.
Alexander Halliday
BY Munn & Co.
ATTORNEYS

UNITED STATES PATENT OFFICE.

JOHN SCOTT WAIT, JR., AND ALEXANDER HALLIDAY, OF TWO HARBORS, MINNESOTA.

BOLT.

1,082,376.  Specification of Letters Patent.  Patented Dec. 23, 1913.

Application filed May 8, 1913. Serial No. 766,361.

*To all whom it may concern:*

Be it known that we, JOHN SCOTT WAIT, Jr., and ALEXANDER HALLIDAY, citizens of the United States, and residents of Two Harbors, in the county of Lake and State of Minnesota, have invented a new and useful Improvement in Bolts, of which the following is a specification.

My invention is an improvement in bolts, and has for its object to provide a bolt for use with fish plates for connecting rail ends so constructed that the fish plates may be clamped together on the rail ends, and held firmly in such position, without the necessity of threaded holding bolts and nuts.

In the drawings: Figure 1 is a side view of a portion of the meeting ends of rails held by the improved bolt, Figs. 2 and 3 are sections on the lines 2—2 and 3—3, respectively, of Fig. 1, and Fig. 4 is a top plan view of the key closed.

In the present embodiment of the invention the meeting ends of the rails 1 are held in alinement by means of fish plates, the said plates being arranged on opposite sides of the rails. Each of the said fish plates comprises a vertical portion 2 and an integral approximately horizontal portion 3. The portion 2 of each fish plate is channeled longitudinally on its inner face as indicated at 4, so that the said portion engages the web 5 of the rail at two points only, namely, adjacent to the tread of the rail and adjacent to the base flange 6 of the rail.

The upper side edge of each fish plate is shaped to fit the adjacent side of the under face of the tread of the rail as indicated at 7, and the portion 3 of each of the said fish plates rests upon the upper face of the adjacent side of the base flange 6. The outer edge of each of the said portions 3 of the fish plates is provided with a flange 8, fitting against the tie at the outer side edge of the base flange. The portions 2 of the opposite fish plates are provided with the usual openings 9, registering with each other and with openings 10 in the web 5 of the rail, and the improved holding bolts are passed through the said registering openings to hold the fish plates together on the rails. Each of the said holding bolts comprises a body 11 of cylindrical form, having each of its ends reduced as indicated at 12, and also of cylindrical form, and a head 13 is journaled on each of the said reduced ends, each of the said heads having a central hub or bearing 14, for engaging the reduced end.

The openings 9 of the fish plates are horizontally arranged slots as indicated in Fig. 1, for permitting the passage of the heads 13, and adjacent to each of the said openings a plurality of cam surfaces 15 is provided on the outer face of each fish plate. Each of the said cam surfaces is approximately a quadrant of a circle, the outer edge 16 thereof being arc-shaped and formed on a circle having the body 11 of the bolt as a center, and the ends of the slots 9 of the fish plates are also arc-shaped, formed on the same arc as the edge 16 and continuous therewith. The said cam surfaces 15 are arranged on opposite sides of the slot, and at opposite ends thereof as shown in Fig. 1, and each of the said cam surfaces is of greatest depth at the slot and gradually decreases in depth toward the end remote from the slot. The said surfaces are engaged by the inner flat faces of the head 13, and as the head is turned, it will be evident that the said surfaces will tend to force the heads outwardly or to force the fish plates toward each other.

In laying track with the improved bolts, the rails are placed in alinement in the usual manner and the fish plates 2—3 are placed on opposite sides of the meeting ends of the rails. The portions 2 of the fish plates are then forced into tight contact with the meeting ends of the rails by any suitable means, and while held in such close contact, the holding bolts 11—12 are placed. The slots 9 of the fish plates are of sufficient width to permit the passage of the bodies 11 of the bolts, and the said bolts are placed with the bodies thereof in the openings of the web and in the openings 9 of the fish plates. The heads 13 are then turned into upright position, and as the inner faces thereof move over the cam surfaces 15, the fish plates are forced together, thus clamping the meeting ends of the rails tightly and preventing displacement thereof. The heads may be locked from rotation by means of the key shown in Fig. 4, the said key being formed from a strip 17 of suitable metal having at one end a longitudinally extending slot 18.

The slot 18 extends over approximately one-half the length of the strip, and the said slot is formed by removing a portion of the material of the strip. The body portion of the strip is inserted in the openings 9 of one of the fish plates at one side of the body 10 of the bolt. The web of the rail is slotted adjacent to the opening 10, at the said side, and the body of the key is doubled upon itself, the fold being in alinement with the slot 18. The double body of the key is within the slot of the web, with the tongues 19, extending through the openings 9 adjacent to the body 10 of the bolt. The strip is of such width that when folded it will engage at one edge the body of the bolt, and at the other the end of the opening. The tongues 19 are then bent away from each other as shown in Figs. 1 and 2 into contact with the outer face of the fish plate on opposite sides of the opening 9.

The locking keys may be arranged at each side of the meeting ends of the rail, that is, one of the said devices in engagement with each head. The heads may be turned by means of a suitable wrench, and the fish plates may be clamped on the rails in any suitable manner.

It will be evident that the improved holding devices may be placed in much shorter time than the usual bolts. In addition the cost of the said devices will be much less than ordinary bolts, since no threading of either bolt or head is required.

In practice it has been found practically impossible to prevent the nuts becoming loosened on the bolt, thus permitting the rails to spread and causing many serious accidents. With the improved bolts, the heads cannot turn unless the locking key is removed, and so long as the head cannot turn, the bolts can not become loosened. The tongues 19 of the keys after they are turned into the position of Figs. 1 and 2, engage the opposite ends of the head to absolutely prevent any movement thereof. It will be noted from an inspection of Fig. 2 that the strip 17 is of sufficient thickness to prevent accidental bending of the same.

It will be evident that any form of fish plate may be used in connection with the improved bolt. The fish plates shown are of the ordinary type and are preferable because of the resiliency imparted to the plates by the channeling of the inner faces. It will be understood that the openings in the webs of the rail are elongated to correspond with the openings in the fish plates in order to permit the passage of the bolts through the web of the rail.

I claim:—

1. In combination, a bolt having its ends reduced, a transverse head journaled on each of the reduced ends, fish plates having slots for permitting the passage of the heads, each plate having on its outer face adjacent to each slot a plurality of recesses, the recesses at each slot being on opposite sides and at opposite ends thereof, each of the said recesses being of quadrantal form and gradually decreasing in depth from the slot.

2. In combination, a bolt having its ends reduced, a transverse head journaled on each of the reduced ends, fish plates having slots for permitting the passage of the heads, each plate having a plurality of cam surfaces at each slot for pressing the adjacent head outward as it is turned transverse to the slot.

3. In combination with the meeting ends of the rails and the fish plates on opposite sides of the said end, the webs of the rails having openings and the fish plates having slots registering with the openings at their centers, a holding device engaging each series of registering openings, each of the said devices comprising a body extending at each end beyond the outer face of the adjacent fish plate, a transverse head journaled on each of the said ends of the body, and means in connection with each head and the fish plate for moving the said head and the fish plates in opposite directions when the head is turned transverse to the opening, and means for preventing reverse movement of the head.

4. In combination with the meeting ends of the rails and the fish plates on opposite sides of the said ends, the webs of the rails having openings and the fish plates having slots registering with the openings at their centers, a holding device engaging each series of registering openings, each of the said devices comprising a body extending at each end beyond the outer face of the adjacent fish plate, a transverse head journaled on each of the said ends of the body, and means in connection with each head and the fish plate for moving the said head and the fish plates in opposite directions when the head is turned transverse to the opening.

5. In combination with the meeting ends of the rails and the fish plates on opposite sides of the said ends, the webs of the rails having openings and the fish plates having slots registering with the openings at their centers, a holding device engaging each series of registering openings, each of the said devices comprising a body extending at each end beyond the outer face of the adjacent fish plate, and a transverse head journaled on each of the said ends of the body.

6. A bolt of the character specified, comprising a body having its ends reduced, and a head journaled on each of the said ends.

7. A bolt of the character specified, comprising a body and heads journaled on the ends of the body and extending transversely thereof.

JOHN SCOTT WAIT, Jr.
ALEXANDER HALLIDAY.

Witnesses:
J. GILBERT JELLE,
BERTHA C. HAVNER.

Copies of this patent may be obtained for five cents each, by addressing the "Commissioner of Patents, Washington, D. C."